United States Patent Office 3,836,623
Patented Sept. 17, 1974

3,836,623
METHOD FOR SEALING HIGH PRESSURE FUEL TANKS AND SEALING COMPOSITION THEREFOR
James E. Matherly, Midland, Mich., assignor to Dow Corning Corporation, Midland, Mich.
No Drawing. Original application Sept. 13, 1971, Ser. No. 180,158, now Patent No. 3,755,380. Divided and this application Jan. 19, 1973, Ser. No. 324,917
Int. Cl. B29c *13/00, 25/00*
U.S. Cl. 264—267
11 Claims

ABSTRACT OF THE DISCLOSURE

High pressure fuel tanks are sealed by injecting under pressure into sealant grooves an admixture of an inert permanently plastic non-curing sealing composition with organic peroxide where the amount of organic peroxide is sufficient to alter the flowability of the sealing composition but insufficient to cure the sealing composition to a non-reinjectable material after the organic peroxide has been activated and thereafter heating the fuel tank above the activation temperature of the organic peroxide. A mixture of poly-3,3,3-trifluoropropylmethylsiloxane fluid, poly-3,3,3-trifluoropropylmethylsiloxane gum, an extending filler, a polytetrafluoroethylene resin and a small amount of an organic peroxide is a particular inert permanently plastic non-curing sealing composition admixture.

---

This is a division of application Ser. No. 180,158, filed Sept. 13, 1971, now U.S. Pat. No. 3,755,380.

This invention relates to a method for sealing or resealing fuel tanks such as the integral fuel tanks designed for groove injection type sealing found in the wings of jet aircraft, particularly the high pressure fuel tanks. This invention also relates to an inert permanently plastic non-curing sealing composition admixture therefor.

As the advances in the jet aircraft construction and requirements change to meet demands of performance, the fuel tank construction and materials also must change to meet the demands of performance. Whereas the sealant compositions described in U.S. Pat. No. 3,192,175 and in U.S. Patent Application Ser. No. 20,865, filed Mar. 18, 1970, U.S. Pat. No. 3,630,982, were suitable to meet the construction and performance requirements of fuel tanks of jet aircraft designed in the past as well as some of contemporary designs, they fail to meet the construction and performance requirements for the high pressure fuel tanks, such as 20 p.s.i. at temperatures of >300° F., of jet aircraft being designed at present. The prior art sealing compositions fail to satisfactorily prevent leakage of fuel over extended periods of pressurized use, since the sealing composition is forced from the seal grooves and resealing is frequently required which greatly add to the maintenance cost as well as to the potential danger of loss of pressure and fuel by leakage. Because the sealing material must be replaced from time to time for reasons of damage and repair, the sealing material must not be cured and must exhibit the ability to be flowable enough to allow further injections (reinjectable). If the sealing material would cure, sealing material could not be replaced by reinjection into the grooves. The present invention meets the requirements of the construction and performance for high pressure fuel tanks by providing a method for sealing the high pressure fuel tanks as well as providing a novel inert permanently plastic non-curing sealing composition.

This invention relates to a method of sealing high pressure fuel tanks comprising injecting under pressure into a sealant groove of said fuel tank a sufficient amount of an admixture of an inert permanently plastic non-curing sealing composition and organic peroxide to fill any voids of said groove, said organic peroxide being present in said sealing composition in an amount sufficient enough to alter the flowability of the sealing composition but insufficient to cure the sealing composition to a non-reinjectable material after activation of the organic peroxide has taken place, and thereafter heating the fuel tank to a temperature sufficient to activate the organic peroxide whereby the sealing composition remains an inert permanently plastic non-curing sealing composition which prevents fuel leakage and which can be replaced by further injecting new admixture of the inert permanently plastic non-curing sealing composition and organic peroxide.

Groove-injection type sealing is well known in the art. Basically a sealant injection gun which can exert pressure is used to force the sealing composition through an orifice of a fitting into the sealant grooves which are at the junctions where the various structural pieces are fastened together to make the fuel tank. The number of such fittings will depend upon the size and complexity of the fuel tank.

The sealing composition for such groove-injection type sealing must be of an inert permanently plastic non-curing type. For the purposes of this invention, inert means that the integrity of the sealing composition will not be affected by the fuel for which the tank is used. Permanently plastic means that the sealing composition remains pliable and extrudable throughout its useful life. Non-curing means that the composition is uncured, and does not cure at any time during its use to a crosslinked network material which will be non-reinjectable. Thus, the inert permanently plastic non-curing sealing composition is an extrudable putty-like mastic and must remain so throughout its use. An illustration of an inert permanently plastic non-curing sealing composition is a silicone sealing composition, particularly a fluorosilicone sealing composition, the latter being the particular class of sealing compositions to which the sealing composition of the present invention is included.

The inert permanently plastic non-curing sealing compositions are mixed with organic peroxide. The amount of organic peroxide in the admixture is sufficient enough to alter the flowability of the sealing composition but insufficient to cure the sealing composition to a non-reinjectable material after activation of the organic peroxide has taken place. In the groove-injection type sealing, the sealing composition must be sufficiently flowable to allow injection through an injection-gun without undue pressure. If the pressure required were to high, the injection process would be slow and if a sealing composition was so viscous as to require an excessive pressure the assurance that the entire void of the groove was filled would be in doubt. Thus, the sealing compositions are reasonably flowable under pressure. However, because the sealing composition must remain in place to perform its sealing function and at the same time be permanently plastic and non-curing, the sealing compositions are a special class of materials in and of themselves. The sealing compositions have characteristics somewhat similar to thixotropic compositions wherein the material is flowable under pressure but is non-flowing when a force is not being applied. This characteristic may be suitable for uses where little or no force is being exerted, however, where high pressures are involved this type of characteristic is insufficient to satisfactorily perform a sealing function. The insufficiency of prior art sealing compositions to meet the high pressure uses is shown by Rosner in U.S. Pat. No. 3,580,870 in which he shows the use of a sealing composition containing varying sizes of beads which cluster to block the escape paths for the sealing composition. Although this beaded sealing composition may resolve many of the sealing problems in high pressure usage compared to nonbeaded compositions, there still remains some problems. The beads described by Rosner can be of various types such as glass, ceramics, metal, metal oxides, plastics and the like. The beads such as the glass beads, ceramic beads and metal oxide beads are hard and rigid. This hard type of bead can abraid the fitting or groove structure and cause other similar problems. Also these materials can break under pressure because of their rigidity. The plastic beads, however, are deformable under pressure and do not abraid the fitting or groove structure or do not break, but because of their ability to deform under pressure their ability to completely block sealing composition leakage is reduced. Thus, a further advance in the art has become necessary.

The method of the present invention is such an advance in the sealing art. The inert permanently plastic non-curing sealing composition is mixed with an organic peroxide. The sealing composition is thus readily injectable by an injection gun. This sealing composition, however, is sufficiently viscous to allow it to function as a seal under high pressure for a period of time. After the sealing composition is injected into a groove in a fuel tank, the fuel tank is heated to a temperature sufficient enough to activate the organic peroxide. The organic peroxide changes the flowability of the sealing composition sufficiently enough to provide a seal which will not leak when high pressures are applied. However, the amount of organic peroxide is insufficient to cure the sealing composition to a non-reinjectable material.

The sealing composition must be flowable enough after the organic peroxide has been activated to allow the old sealing composition to be pushed out by reinjecting the groove of a fuel tank with fresh sealing composition. If the sealing composition cures, it could not be forced out of the fuel tank groove by the fresh sealing composition. The sealing composition prevents fuel leakage after activation of the organic peroxide but does not cure as it remains an inert permanently plastic non-curing sealing composition.

The fuel tank can be heated by any of the conventional heating means, such as by an oven, infrared, ultrasonics, and frictional means. Fuel tanks of a small size may be readily heated by any of the above conventional means. However, the present invention is particularly designed to solve the problem of sealing high pressure fuel tanks of jet aircraft for which many of the conventional heating means are not practical. For example, it would be very expensive and impractical to build an oven large enough to heat an entire wing fuel tank of a jet aircraft. Furthermore, once the aircraft is constructed, the reinjection of a fuel tank with sealing composition would be even more impractical. It would also be impractical to attempt to heat just that portion of the fuel tank where the sealing composition is placed. To heat an aircraft fuel tank in certain areas, would no doubt be damaging to the entire aircraft structure. The hot spots would expand and thus warping could readily result. The present invention resolves such heating problems by unexpectedly finding that the present admixture of organic peroxide and inert permanently plastic non-curing sealing composition can be activated by frictional means. This frictional means can best be accomplished by the first flight of the jet aircraft after the fuel tank has been injected with the admixture. The aircraft is flown at a velocity sufficient enough to heat the wing fuel tanks to a temperature sufficiently enough to activate the organic peroxide. The organic peroxide changes the flowability of the sealing composition and the fuel tank is provided with a seal which prevents fuel leakage under high pressures. The sealing composition is sufficiently viscous to hold its sealing function while the aircraft is reaching the organic peroxide activation temperature. This method is particularly advantageous for combat usage as well as in remote areas where it would be totally impractical to even consider other heating means. An aircraft which has a damaged fuel tank could be repaired, reinjected with sealing composition and then flown at a sufficient velocity to activate the organic peroxide. Thus, the air passing over the aircraft wing fuel tank causes frictional heating and the temperature raises to a maximum of about 177° C. Thus, the only equipment needed would be a pressure injection gun and the sealing composition.

The activation temperatures of each organic peroxide will vary depending upon the particular organic peroxide used. However, since the wing temperatures usually do not exceed about 177° C., the organic peroxide should have an activation temperature below about 160° C. Since long storage is considered a likelihood the organic peroxide should be stable up to about 75° C. Organic peroxides include dicumyl peroxide, 2,5-bis(tert-butyl-peroxy)-2,5-dimethylhexane, benzoyl peroxide, and 2,4-dichlorobenzoyl peroxide among others. The most preferred organic peroxides are dicumyl peroxide and 2,5-bis(tert-butyl-peroxy)-2,5-dimethylhexane because of their all around properties, such as low volatility, low activity below 75° C. and an activation temperature below 160° C.

A mixture which is an inert permanently plastic non-curing sealing composition and which is particularly suited for the method of the present invention consists essentially of 10 parts by weight of a poly-3,3,3-trifluoropropylmethylsiloxane having a viscosity of from 20,000 to 150,000 cs. at 25° C., from 50 to 150 parts by weight of a poly-3,3,3-trifluoropropylmethylsiloxane gum, from 0 to 50 parts by weight of a finely divided reinforcing silica filler having a surface area of at least 100 square meters per gram, from 50 to 250 parts by weight of an inorganic extending filler having an average particle size of less than 20 microns, from 0.5 to 25 parts by weight of a polytetrafluoroethylene resin having an average particle size of less than one micron and an amount of organic peroxide sufficient enough to alter the flowability of the sealing composition but insufficient to cure the sealing composition to a non-reinjectable material after activation of the organic peroxide has taken place.

The poly 3,3,3-trifluoropropylmethylsiloxanes having a viscosity of from 20,000 to 150,000 cs. at 25° C., preferably from 25,000 to 50,000 cs. at 25° C. are well known in the art. These fluids are satisfactory in the present composition, however, sealing compositions having a poly-3,3,3-trifluoropropylmethylsiloxane fluid with a viscosity less than 20,000 cs. at 25° C. do not have the seal efficiency as desired, especially prior to peroxide activation, whereas viscosities greater than 150,000 cs. at 25° C. are impractical to prepare and use. Since the sealing composition also contains a gum and the flowability of the composition is increased, the viscosities of the fluid greater than 150,000 cs. at 25° C. would make the final sealing composition too stiff as well as the activated sealing composition.

The poly-3,3,3-trifluoropropylmethylsiloxane gums, where a gum is a siloxane having a viscosity greater than 1,000,000 cs. at 25° C. are well known in the art. Both the gums and the fluid can contain small amounts, less than 10 mol percent, of other siloxane units such as dimethylsiloxane, phenylmethylsiloxane, bis-3,3,3-trifluoropropylsiloxane, diphenylsiloxane, phenylvinylsiloxane and methylvinylsiloxane. The gum and the fluid are endblocked with hydroxyl radicals or triorganosiloxy units such as trimethylsiloxy, 3,3,3-trifluoropropyldimethylsiloxy, vinyldimethylsiloxy, diphenylmethylsiloxy and methylphenylvinylsiloxy units. The gum and fluid preferably are endblocked with vinyl containing triorganosiloxy units. The vinyldiorganosiloxy endblocking groups provide a better control of flowability after the peroxide is activated and the amounts of peroxide used can be more easily found when a vinyl specific peroxide is used, such as dicumyl peroxide. The amount of vinylsiloxane units is preferably from 0.1 to 1 mol percent wherein the vinylsiloxane can be vinyldiorganosiloxy endblocking units or organovinylsiloxane units. The poly-3,3,3-trifluoropropylmethylsiloxane gum can be present in an amount of from 50 to 150 parts by weight per 100 parts by weight of the poly-3,3,3-trifluoropropylmethylsiloxane fluid, preferably from 75 to 125 parts by weight gum.

Finely divided reinforcing silica filler can be present and can be any of the well known reinforcing silicas such as fume silica, silica aerogel and silica xerogel which have a surface area of at least 100 square meters per gram. These reinforcing silica fillers can be treated silica fillers which are also well known reinforcing silica fillers. The reinforcing silica fillers can be treated with hexamethylcyclotrisiloxane, hexamethyldisilazane, trimethylchlorosilane, dimethyldimethoxysilane, hexamethyldisiloxane and other well known methods of treating reinforcing silica fillers. The reinforcing silica filler can be present in amounts from 0 to 50 parts by weight per 100 parts by weight of the poly-3,3,3-trifluoropropylmethylsiloxane fluid, preferably from 5 to 20 parts by weight silica filler.

An inorganic extending filler can be any of those extending fillers conventionally used in silicone compositions such as finely divided quartz, diatomaceous earth, metal oxides such as titania and alumina, metal carbonates such as calcium carbonate, metal silicates such as aluminum silicate, zirconium silicate, lithium aluminum silicate and the like. These inorganic extending fillers suitable for the sealing composition of the present invention have a particle size of less than 20 microns, preferably, less than 10 microns. The amount of inorganic extending filler present in the sealing composition can be from 50 to 250 parts by weight per 100 parts by weight of the poly-3,3,3-trifluoropropylmethylsiloxane fluid, preferably from 100 to 200 parts by weight inorganic extending filler.

The polytetrafluoroethylene resins are commercially available materials which have an average particle size of less than one micron, preferably less than 0.75 micron. The polytetrafluoroethylene resin can be present in an amount of from 0.5 to 25 parts by weight per 100 parts by weight of the poly-3,3,3-trifluoropropylmethylsiloxane fluid, preferably from 1 to 5 parts by weight of polytetrafluoroethylene resin. Polytetrafluoroethylene telomers can also be present as further described in copending Application Ser. No. 20,865, filed Mar. 18, 1970, U.S. Patent No. 3,630,982, which is hereby incorporated by reference.

The organic peroxides are defined above and can be present in an amount sufficient enough to alter the flowability of the sealing composition but insufficient to cure the sealing composition to a non-reinjectable material after activation of the organic peroxide has taken place. For most purposes, the organic peroxide is present in an amount greater than 0.001 part by weight based on 100 parts by weight of the poly-3,3,3-trifluoropropylmethylsiloxane fluid. The organic peroxide can be present in an amount of from 0.075 to 0.3 parts by weight per 100 parts by weight of the fluid and for most organic peroxides and ratios of ingredients, the sealing composition will meet all the requirements. The most preferred range is 0.1 to 0.2 part by weight, particularly with dicumyl peroxide and a vinyl containing gum and/or fluid.

The most preferred sealing compositions of the present invention also contain beads which have the ability to exhibit deformation under pressure. These beads are well known in the art and for the most part are plastic beads such as the polystyrenedivinylbenzene beads. The beads can be present in an amount of from 5 to 250 parts by weight wherein the beads have a mesh size of from 16 to 325, preferably the beads are present in amounts of from 5 to 100 parts by weight. The Tyler Standard Screen Mesh is used as the mesh sizes described herein. The beads are preferably a mixture of beads having 55 to 65 percent beads of a mesh size of 20 to 45, 20 to 30 percent beads of a mesh size of 50 to 100 and 10 to 20 percent beads of a mesh size of 200 to 300.

The above mixture of organic peroxide and inert permanently plastic non-curing sealing composition has the advantages of being particularly inert to most fuels and remains plastic over a wide temperature range such as at low temperature found in the arctic regions as well as in the tropical climates and in the hot wings of aircraft. The sealing composition mixture of the present invention also meets the requirements of Military Specification Mil-S-81323(AS) particularly Article 3.10, seal efficiency determination.

The following examples are for illustrative purposes only and should not be construed as limiting the present invention which is properly delineated in the claims.

Example 1

The seal efficiency was determined in accordance with Article 3.10 of Mil-S-81323(AS) by exposing the sealing composition in a jig to jet fuel under 10 p.s.i. pressure and subjecting to 49° C. ±2° C. for 100 hours followed by 10 hours at 71° C. ±2° C. and one hour at 82° C. ±2° C. The jig was tested for leaks and then drained and exposed in an oven with 10 p.s.i. pressure applied continuously for 20 hours at 107° C. ±2° C. followed by 10 hours at 154° C. ±3° C. and one hour at 176° C. ±3° C. At the end of the 176° C. ±3° C. exposure, the jigs were tested for leaks. After the 1.0 minute at 10 p.s.i.g. leak test, the pressure in the jig was increased to 20 p.s.i.g. for 1.0 minute and checked for leaks. This aging constituted one cycle. The jigs must pass 6 cycles to be considered as satisfactory. This test is similar to the Military Specification Mil-S-81323(WP) except for some pressure variations as defined above and the groove gaps were varied as defined herein.

The following compositions were prepared by mixing the ingredients.

(A)

100 parts by weight of a hydroxyl endblocked poly-3,3,3-trifluoropropylmethylsiloxane having a viscosity of 30,000 cs. at 25° C., 100 parts by weight of a poly-3,3,3-trifluoropropylmethylsiloxane gum having 99.4 mol percent 3,3,3-trifluoropropylmethylsiloxane units and 0.6 mol percent methylvinylsiloxane units and a Williams plasticity of about 100 mils, 150 parts by weight of finely divided quartz having a particle size of less than 5 microns, 10 parts by weight of a reinforcing silica having a surface area greater than 100 square meters per gram and treated with hexamethyldisilazane, 2 parts by weight of polytetrafluoroethylene resin having a particle size of 0.05 to 0.5 micron, 2 parts by weight of titanium dioxide pigment, 21.8 parts by weight of polystyrenedivinylbenzene beads having a 20 to 45 mesh, 9.7 parts by weight of polystyrenedivinylbenzene beads having a 50 to 100 mesh, 4.8 parts by weight of polystyrenedivinylbenzene beads having a 200 to 300 mesh and 0.125 part by weight dicumyl peroxide.

(B)

100 parts by weight of a hydroxyl endblocked poly-3,3,3-trifluoropropylmethylsiloxane having a viscosity of about 120,000 cs. at 25° C., 100 parts by weight of the gum defined in (A) above, 150 parts by weight of the quartz defined in (A) above, 10 parts by weight of the reinforcing silica filler defined in (A) above, 6.5 parts by weight of an aqueous dispersion of polytetrafluoroethylene resin defined in (A) above, at 60 weight percent resin solids, 400 parts by weight of a chlorotrifluoroethane solution of polytetrafluoroethylene telomer having an average molecular weight of about 30,000 and having 7.5 weight percent polytetrafluoroethylene telomer solids, and 0.125 part by weight of dicumyl peroxide. This sealing composition being prepared in accordance with Application Ser. No. 20,865, filed Mar. 18, 1970, which is hereby incorporated by reference. The dicumyl peroxide was added last.

(C)

The same formulation as described in (B) above except 0.9625 part by weight dicumyl perxide was added instead of 0.125 part by weight.

(D)

100 parts by weight of the 30,000 cs. poly-3,3,3-trifluoropropylmethylsiloxane defined in (A) above,
100 parts by weight of the gum defined in (A) above,
150 parts by weight of the quartz defined in (A) above,
10 parts by weight of a reinforcing silica filler having a surface area greater than 100 square meters per gram and treated with hexamethylcyclotrisiloxane,
2 parts by weight titanium dioxide pigment,
2 parts by weight of the resin defined in (A) above, and
0.125 part by weight dicumyl peroxide.

(E)

Same formulation as (D) above except 24.3 parts by weight of polystyrene-divinylbenzene beads having a 20 to 45 mesh,
10.8 parts by weight of polystyrenedivinylbenzene beads having a 50 to 100 mesh and 5.38 parts by weight of polystyrenedivinylbenzene beads having a 200 to 300 mesh.

(F)

Same formulation as (B) above without the dicumyl peroxide.

(G)

Same formulation as (B) above except 0.25 part by weight dicumyl peroxide instead of the 0.125 part by weight.

The seal efficiency of the above sealing compositions were tested. Compositions (A), (B), (D) and (E) passed 6 cycles in the seal efficiency test. Composition (E) was further tested for seal efficiency by varying the gap of the sealability fixtures 5 mils, 10 mils and 20 mils. Composition (C) did not complete all 6 cycles, but showed improvement over those compositions containing no peroxide. For this particular formulation 0.0625 part of dicumyl peroxide is slightly insufficient to allow the sealing composition to alter its flowability sufficient enough to pass the test. Composition (F) passed only one cycle. Compositions (A) through (F) were reinjectable whereas Composition G could not be reinjected and was therefore not useful as an inert permanently plastic non-curing sealing composition since it had cured. Composition B was placed in a 66° C. oven for 4 hours and showed no change in plasticity or core pentrometer. However, after heating for one hour at 149° C., the plasticity increased but the sealing composition could still be reinjected.

That which is claimed is:

1. A method of sealing high pressure fuel tanks comprising injecting under pressure into a sealant groove of said fuel tank a sufficient amount of an admixture of an inert permanently plastic non-curing sealing composition and organic peroxide to fill any voids of said groove, said organic peroxide being present in said sealing composition in an amount sufficient enough to alter the flowability of the sealing composition but insufficient to cure the sealing composition to a non-reinjectable material after activation of the organic peroxide has taken place, and thereafter heating the fuel tank to a temperature sufficient to activate the organic peroxide whereby the sealing composition remains an inert permanently plastic non-curing sealing composition which prevents fuel leakage and which can be replaced by further injecting new admixture of the inert permanently plastic non-curing sealing composition and organic peroxide.

2. The method in accordance with claim 1 in which the heating is derived from frictional means.

3. The method in accordance with claim 2 in which the fuel tank is an aircraft wing fuel tank and the frictional means is air passing over the aircraft wing where the aircraft on its first flight after injecting the sealing composition admixture is flying at a sufficient velocity such that the fuel tank temperature is at least the activation temperature of the organic peroxide.

4. The method in accordance with claim 1 in which the inert permanently plastic non-curing sealing composition of the admixture consists essentially of 100 parts by weight of poly-3,3,3-trifluoropropylmethylsiloxane having a viscosity of from 20,000 to 150,000 cs. at 25° C., from 50 to 150 parts by weight of a poly-3,3,3-trifluoropropylmethylsiloxane gum, from 0 to 50 parts by weight of a finely divided reinforcing silica filler having a surface area of at least 100 square meters per gram, from 50 to 250 parts by weight of an inorganic extending filler having an average particle size of less than 20 microns, from 0.5 to 25 parts by weight of a polytetrafluoroethylene resin having an average particle size of less than one micron.

5. The method according to claim 4 in which the mixture also contains 5 to 250 parts by weight of beads having a mesh size of 16 to 325 where said heads have the ability to exhibit deformation under injection pressures.

6. The method according to claim 5 in which the beads are present in an amount of from 5 to 100 parts by weight.

7. The method according to claim 6 in which the beads are styrene-divinylbenzene beads.

8. The method according to claim 5 in which the beads are a mixture of beads having 55 to 65 weight percent beads of a mesh size of 20 to 45, 20 to 30 weight percent beads of a mesh size of 50 to 100 and 10 to 20 weight percent beads of a mesh size of 200 to 300.

9. The method according to claim 7 in which the beads are a mixture of beads having 55 to 65 weight percent beads of a mesh size of 20 to 45, 20 to 30 weight percent beads of a mesh size of 50 to 100 and 10 to 20 weight percent beads of a mesh size of 200 to 300.

10. The method according to claim 3 in which the inert permanently plastic non-curing sealing composition of the admixture consists essentially of 100 parts by weight of poly-3,3,3-trifluoropropylmethylsiloxane having a viscosity of from 20,000 to 150,000 cs. at 25° C., from 50 to 150 parts by weight of a poly-3,3,3-trifluoropropylmethylsiloxane gum, from 0 to 50 parts by weight of a finely divided reinforcing silica filler having a surface area of at least 100 square meters per gram, from 50 to 250 parts by weight of an inorganic extending filler having an average particle size of less than 20 microns, from 0.5 to 25 parts by weight of a polytetrafluoroethylene resin having an average particle size of less than one micron.

11. The method according to claim 10 in which a mixture of beads having the ability to exhibit deformation under injection pressures consisting essentially of 55 to 65 weight percent beads of a mesh size of 20 to 45, 20 to 30 weight percent beads of a mesh size of 50 to 100 and 10 to 20 weight percent of a mesh size of 200 to 300.

References Cited
UNITED STATES PATENTS

| | | | |
|---|---|---|---|
| 3,192,175 | 6/1965 | Russell | 260—37 SB |
| 3,006,878 | 10/1961 | Talcott | 260—37 SB |
| 3,580,870 | 5/1971 | Rosner | 106—33 |
| 2,927,908 | 3/1960 | Konkle et al. | 260—37 SB |
| 3,386,945 | 6/1968 | Bartell et al. | 260—37 SB |

JEFFERY R. THURLOW, Primary Examiner

U.S. Cl. X.R.
264—36, 68, 345

UNITED STATES PATENT OFFICE
CERTIFICATE OF CORRECTION

Patent No. 3,836,623          Dated September 17, 1974

Inventor(s) James E. Matherly

It is certified that error appears in the above-identified patent and that said Letters Patent are hereby corrected as shown below:

Column 8, line 25, after "said", delete "heads" and insert -- beads --.

Signed and sealed this 8th day of April 1975.

(SEAL)
Attest:

RUTH C. MASON
Attesting Officer

C. MARSHALL DANN
Commissioner of Patents
and Trademarks